United States Patent
Kandt

(10) Patent No.: US 7,977,601 B2
(45) Date of Patent: Jul. 12, 2011

(54) X AND Y ORTHOGONAL CUT DIRECTION PROCESSING WITH SET BEAM SEPARATION USING 45 DEGREE BEAM SPLIT ORIENTATION APPARATUS AND METHOD

(75) Inventor: Leonard Kandt, Beaverton, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 1231 days.

(21) Appl. No.: 11/287,842

(22) Filed: Nov. 28, 2005

(65) Prior Publication Data

US 2007/0119831 A1    May 31, 2007

(51) Int. Cl.
*B23K 26/00*    (2006.01)

(52) U.S. Cl. ......... 219/121.68; 219/121.67; 219/121.69; 219/121.64; 219/121.72; 219/121.74; 219/121.75; 219/121.76; 219/121.78; 219/121.79; 219/121.82

(58) Field of Classification Search . 219/121.67–121.69, 121.72, 121.74–121.76, 219/121.78, 121.79, 121.82; 438/110
See application file for complete search history.

(56) References Cited

U.S. PATENT DOCUMENTS

| | | | |
|---|---|---|---|
| 5,113,055 A | 5/1992 | Kuriyama | |
| 5,373,137 A * | 12/1994 | McLaughlin | 219/121.68 |
| 5,763,853 A * | 6/1998 | Shimomura et al. | 219/121.62 |
| 2002/0031899 A1* | 3/2002 | Manor | 438/460 |
| 2002/0139786 A1* | 10/2002 | Amako et al. | 219/121.76 |
| 2003/0006221 A1* | 1/2003 | Hong et al. | 219/121.72 |
| 2004/0104202 A1* | 6/2004 | Downes et al. | 219/121.8 |
| 2005/0202651 A1* | 9/2005 | Akram | 438/463 |

* cited by examiner

*Primary Examiner* — Tu B Hoang
*Assistant Examiner* — Brian Jennison
(74) *Attorney, Agent, or Firm* — Young Basile

(57) ABSTRACT

An X & Y orthogonal cut apparatus for scribing a pair of parallel cuts on a planar workpiece, the workpiece plane having an X-axis and a Y-axis, where the apparatus includes a laser device generating at least two beams including a first beam and a second beam, the first beam and the second beam each having an impact point on the workpiece, the first and second impact points being positioned diagonally with respect to the X and Y axes of the workpiece, and at least one actuator to move at least one of the impact points relative to the workpiece and the workpiece relative to the impact points.

18 Claims, 6 Drawing Sheets

X AND Y ORTHOGONAL CUT DIRECTION PROCESSING WITH SET BEAM SEPARATION USING 45 DEGREE BEAM SPLIT ORIENTATION APPARATUS AND METHOD

FIELD OF THE INVENTION

This invention relates to the processing of semiconductor wafers. More particularly, the invention relates to an apparatus and method for scribing a pair of parallel cuts on a planar workpiece using a first beam and a second beam, each having an impact point on the workpiece, where the first and second impact points are positioned diagonally with respect to X and Y axes defined by the workpiece.

BACKGROUND

In the microelectronics industry, sheets of semiconductor materials are typically sawed into individual wafers using dicing saws. With dicing saws, there are several possible concerns including thermally and/or mechanically-induced cracking and or adhesion loss between adjacent layers, poor mechanical strength, moisture absorption and/or time-dependent behavior due to the use of coolant, texture effects and poor thermal conductivity. Of these possible concerns, thermally and/or mechanically induced cracking and/or adhesion loss and moisture absorption are significant. Large tensile and shear stresses are imparted at the cut zone, which can lead to cracking and/or adhesion loss leading to delamination between adjacent layers. Further, the use of coolant during sawing can lead to moisture absorption and time-dependant behavior.

One approach to reduce potential problems with mechanically induced delamination is to reduce saw speed. However, this reduces throughput and productivity. In addition, the potential problems relating to moisture absorption still remain.

Another approach is to cut or scribe a trench wider than the saw in the areas to be sawed using a laser device generating a single beam. The beam scribes through low dielectric constant (low-k) and metal layers, for example, and stops at the silicon. Following the laser scribing, the saw is used to cut through the silicon and singulate the wafers. The area removed by the laser acts as a crack stop and ensures that these cracks do not propagate into the wafer and potentially affect the electrical performance of a finished integrated circuit contained on the wafer. The disadvantage of using a single laser beam is the requirement of cutting a fairly wide trench in the low-k and metal layers.

Still another approach is to scribe using a laser device generating at least two beams to make two trenches, one on each side of the area to be sawed. This eliminates the potential problem of cutting a wide trench. The operation of such a system is generally shown in FIG. 6. FIG. 6 illustrates a planar workpiece 200. A pair or laser beams impact workpiece 200 at impact points 202 and 204. Impact points 202 and 204 are orthogonal to an X-axis 206 of the workpiece 200. A pair of parallel trenches may be scribed on the workpiece 200 by either moving the workpiece 200 or the laser beams along X-axis 206.

However, using two or more beams to cut parallel trenches requires additional processing time to reorient the workpiece 200 and/or the impact points 202, 204 if it is desired to scribe parallel trenches along a Y-axis 208. Such reorientation increases processing time.

SUMMARY

An X & Y orthogonal cut apparatus for scribing a pair of parallel cuts on a planar workpiece when the planar workpiece is oriented with an X-axis and a Y-axis. The apparatus includes a laser device generating at least two beams including a first beam and a second beam. The first beam and the second beam impact the workpiece at first and second impact points. The first and second impact points are positioned diagonally with respect to the X and Y axes of the workpiece. At least one actuator moves either the laser device or the workpiece to scribe parallel cuts on the workpiece.

DESCRIPTION OF THE DRAWING

The description herein makes reference to the accompanying drawings wherein like reference numerals refer to like parts throughout the several views, and wherein.

DESCRIPTION

Figure 1:
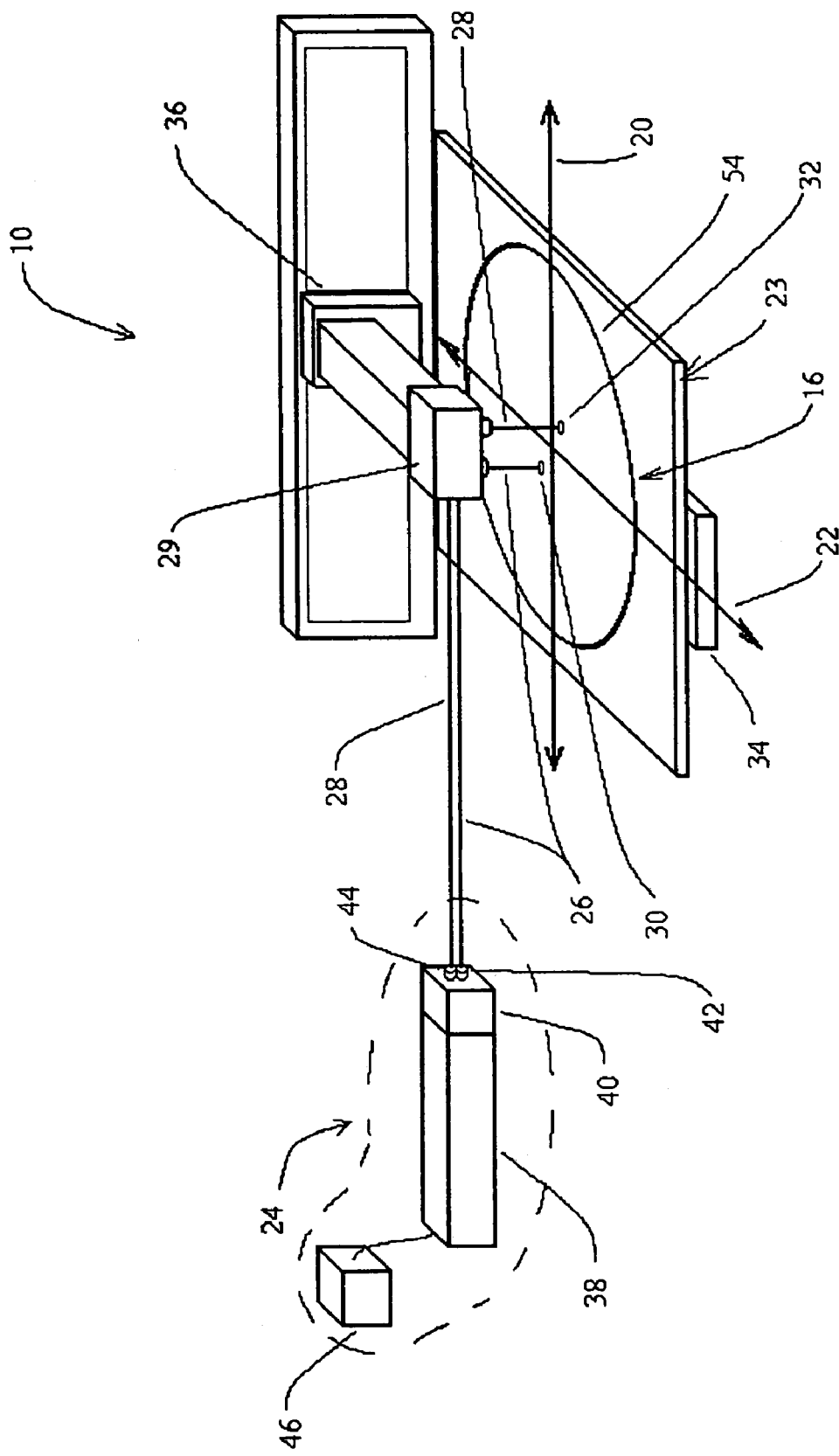
FIG. 1 is a schematic perspective view of an X & Y orthogonal cut apparatus according to an embodiment as disclosed herein.

An X & Y orthogonal cut apparatus 10 is illustrated in FIG. 1. The apparatus 10 is used for scribing a pair of parallel cuts 12, 14 on a planar workpiece 200. In a preferred embodiment, the planar workpiece 200 is a semiconductor wafer. The planar workpiece 200 is oriented along an X-axis 20 and a Y-axis 22. As shown, the planar workpiece 200 may be positioned on a stage 23. The apparatus 10 includes a laser device 24 generating at least two beams including a first beam 26 and a second beam 28. The first and second beams 26 and 28 may pass through positioning optics 29 to direct the laser beams 26 and 28 to the workpiece 200. The first beam 26 and the second beam 28 each have an impact point 30, 32, respectively, on the planar workpiece 200, with the first and second impact points 30, 32 being positioned diagonally with respect to the X and Y axes 20, 22 of the planar workpiece 200. In the preferred embodiment, the apparatus 10 also includes a first actuator 34 to move the stage 23 and thus the planar workpiece 200 relative to the Y axis 22. When the planar workpiece 200 is moved along the Y axis 22, a pair of parallel cuts will be made in the direction of the Y axis 22. The preferred embodiment also includes a second actuator 36 to move the planar workpiece 200 relative to the X axis 20.

The laser device 24 includes a laser 38. Preferably, the laser 38 is a diode-pumped laser and is capable of high-speed focusing and/or high-resolution focusing. The output of the laser 38 passes through optics 40 that divide the output of the laser 38 into first beam 26 and second beam 28. First and second beams 26 and 28 are redirected onto the planar workpiece 200 by the positioning optics 29 to impact on planar"

workpiece 200 at impact points 30, 32. The optics 40 and the positioning optics 29 may each include, for example, one or more lens and/or mirror.

The laser device 24 includes a first shutter 42 to control the first beam 26 and a second shutter 44 to control the second beam 28. The laser device 24 also includes a controller 46 to operate the shutters 42 and 44. Preferably the shutters 42 and 44 are positioned at laser device 24 but it is understood that shutters may be positioned at positioning optics 29.

Figure 3:
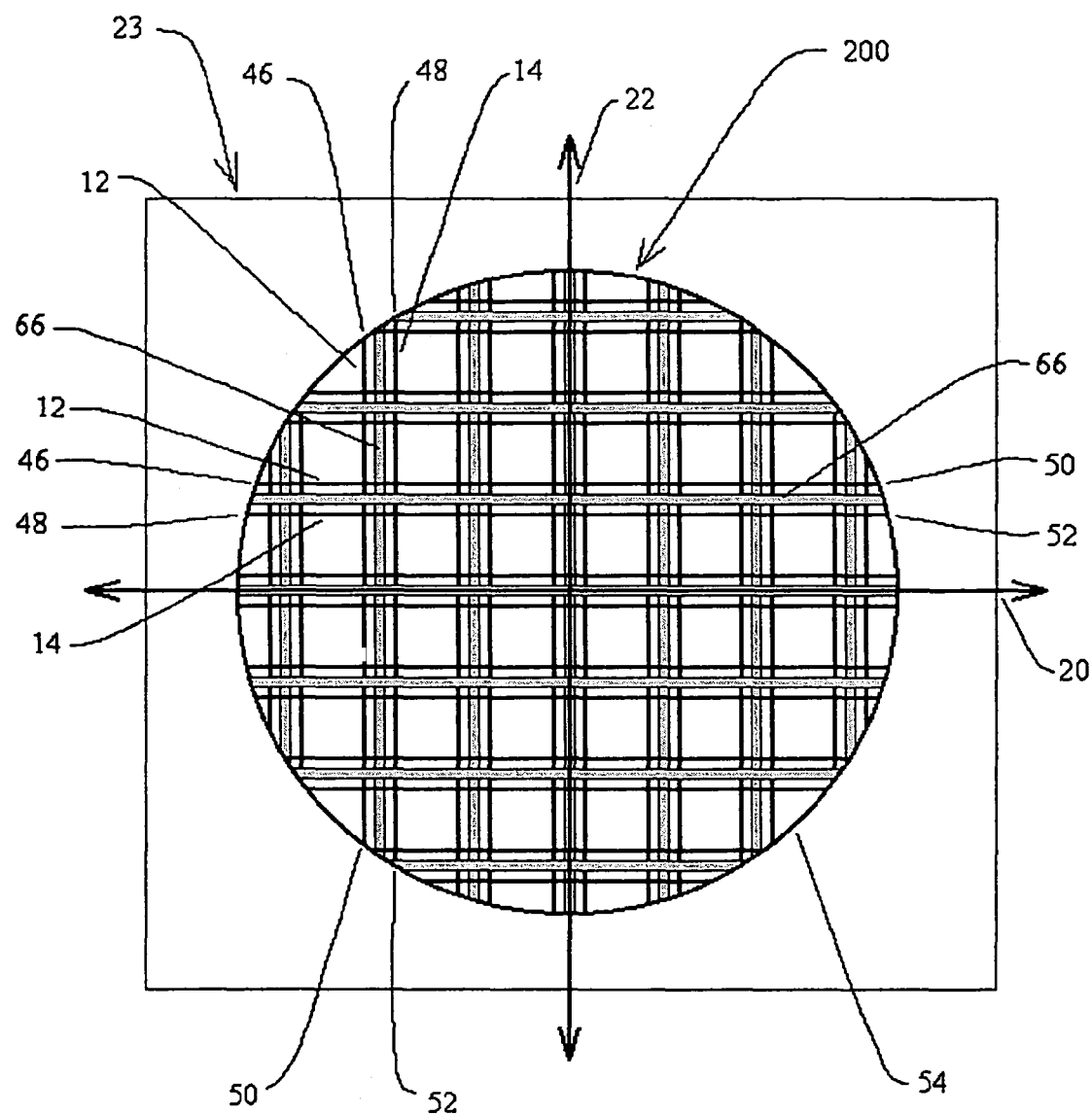
FIG. 3 is a simplified plan view of a workpiece showing parallel scribed cuts on the workpiece.

With reference to FIG. 3, through operation of the shutters 42 and 44 alignment of a first end 46 of the cut 12 made by the first beam 26 with a first end 48 of the cut 14 made by the second beam 28 and/or a second end 50 of the cut 12 made by the first beam 26 with a second end 52 of the cut 14 made by the second beam 28 relative to the X-axis 20, the Y-axis 22, and/or an edge 54 of the planar workpiece 200 is performed as illustrated in FIGS. 1 and 3. By control of the shutters 42 and 44 the cuts 12, 14 can thus be made to start or end at a desired or required position relative to the X-axis 20, the Y-axis 22, or the workpiece edge 54.

Figure 2:
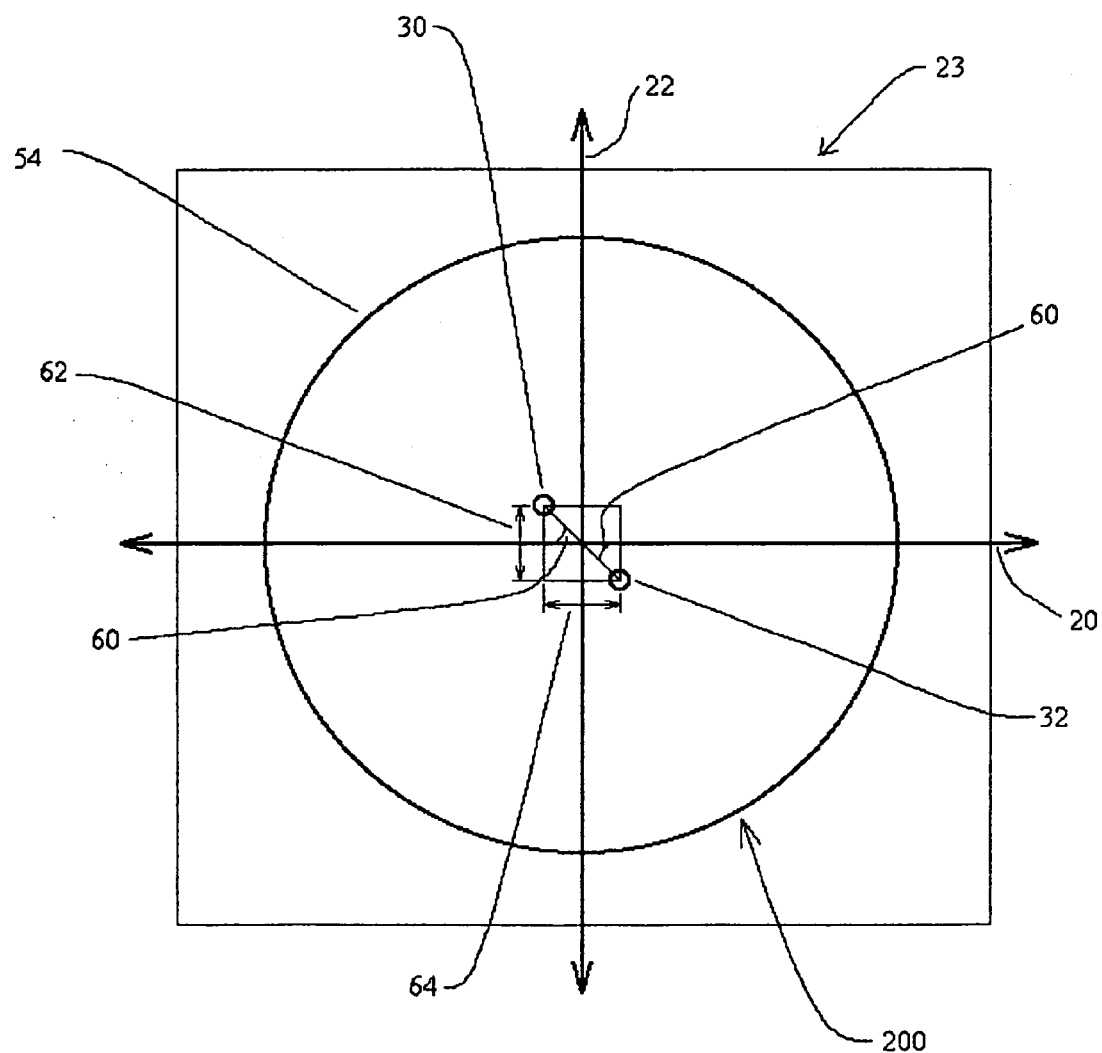
FIG. 2 is a simplified plan view of a workpiece showing a pair of laser impact points on the workpiece as disclosed herein.

As seen in FIG. 2, the positioning optics 29 positions the first impact point 30 diagonally at a forty-five (45) degree angle 60 relative to the second impact point 32 with respect to the X and Y axes 20, 22 of the planar workpiece 200. The result is that a separation 64 along the X-axis 20 of the impact points 20, 26 is generally equal to a separation 62 along the Y-axis 22.

Because the X-axis separation 64 is generally equal to the Y-axis separation 62, generally parallel cuts 12, 14 having generally equal separation can be made along the X-axis 20 and/or the Y-axis 22 without having to reorient the planar workpiece 200, laser beams 26, 28, optics 40, and/or positioning optics 29. Saw cutting zones 66 (shaded) are thus defined by the cuts 12, 14 as shown in FIG. 3.

In the example of FIG. 1, the first actuator 34 moves stage 23 along Y-axis 22 to scribe parallel cuts along Y-axis 22. The second actuator 36 moves positioning optics 29 along the X-axis 20 to scribe parallel cuts along X-axis 20. It is contemplated herein that actuators 34, 36 are driven by a motor that may be a linear motor, a brushless linear motor, a galvanometer, a moving magnet galvanometer, any such suitable actuation mechanism, or any combination thereof.

Figure 4:
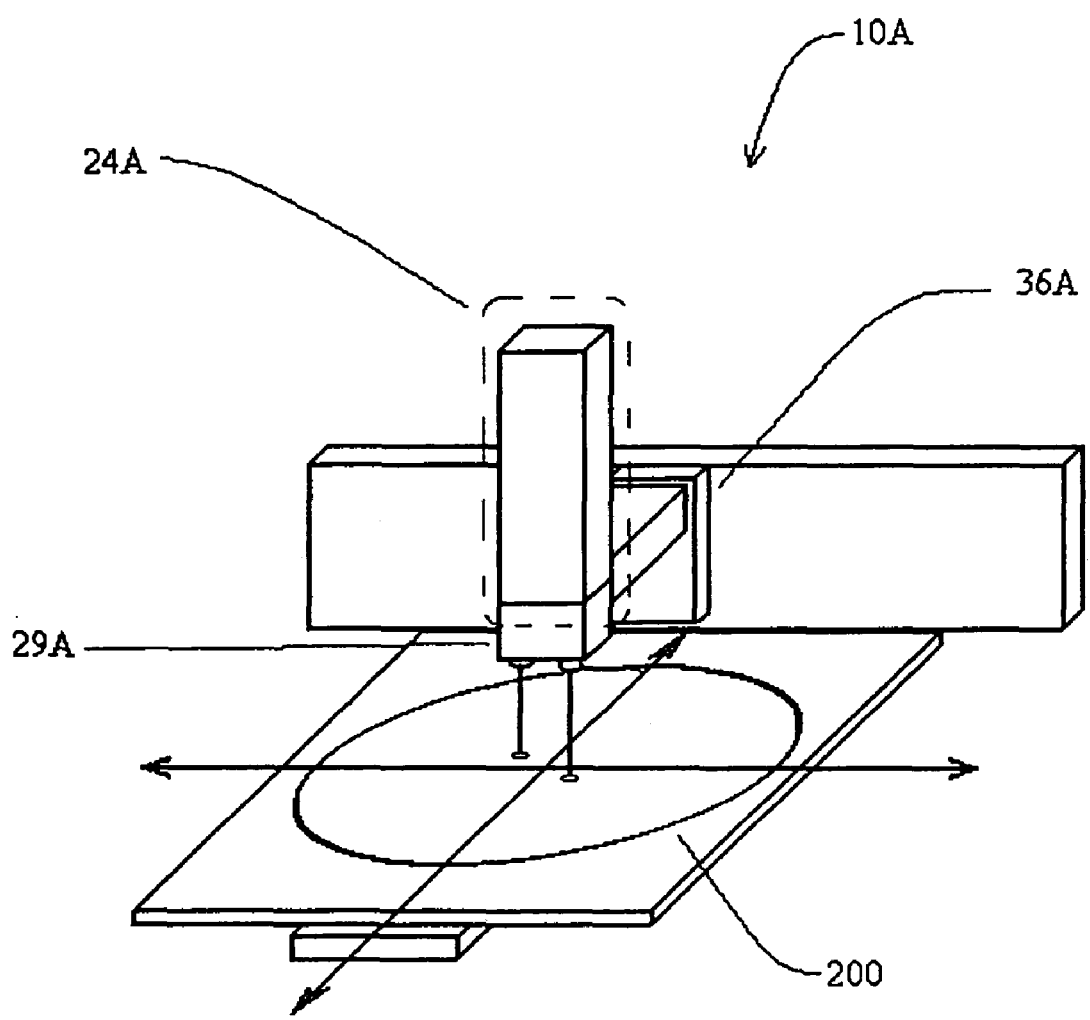
FIG. 4 is a simplified perspective view of a configuration of an X & Y orthogonal cut apparatus having a laser device associated with an actuator as disclosed herein.

A second preferred configuration of an X & Y orthogonal cut apparatus 10A is seen in FIG. 4. In the second preferred embodiment, a laser device 24A is mounted to actuator 36A. In this configuration, actuator 36A moves the entire laser device 24A in addition to the positioning optics 29A.

Figure 5:
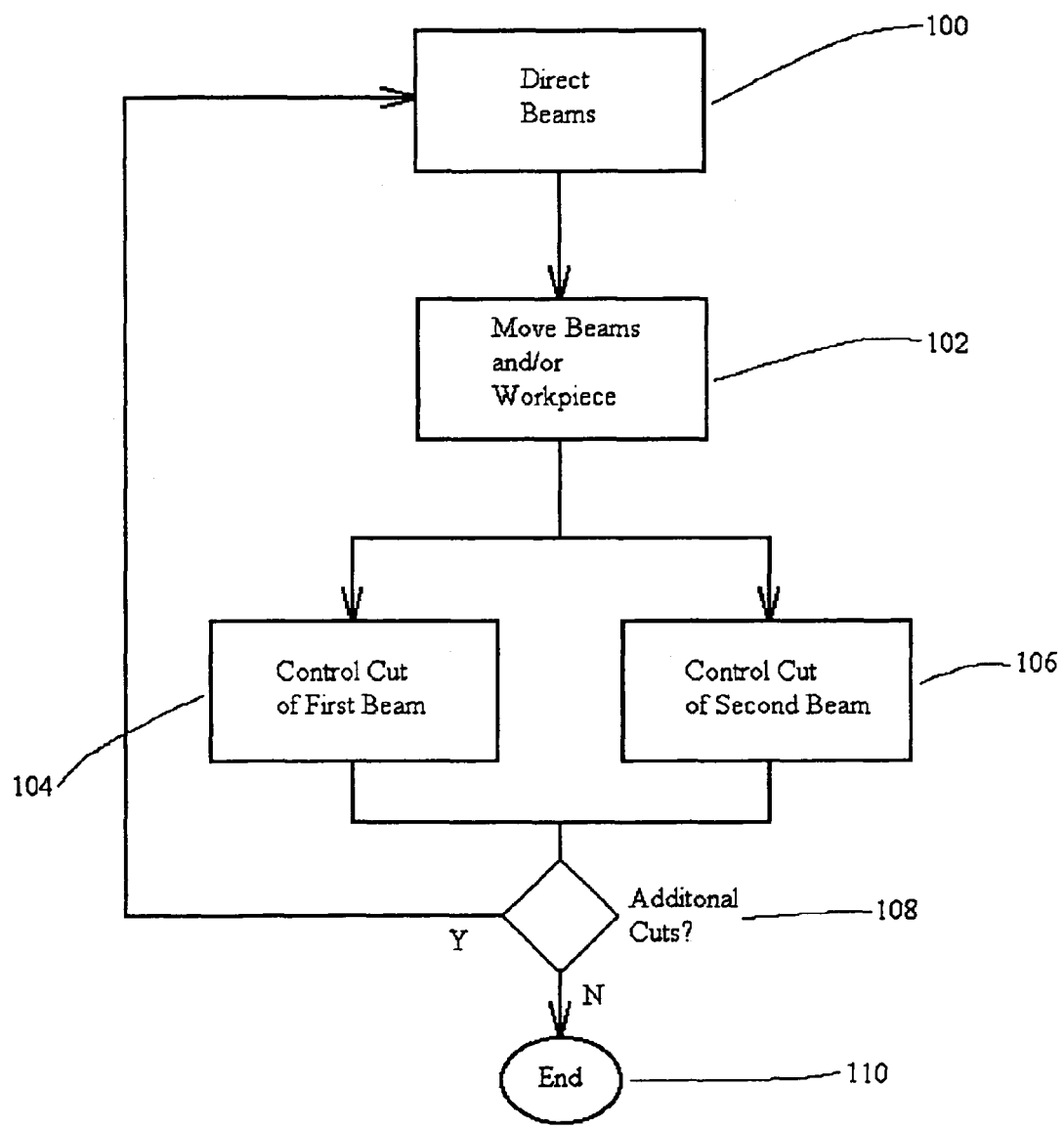
FIG. 5 is block diagram of a process which can be carried out using the apparatus of FIG. 1.
Figure 6:
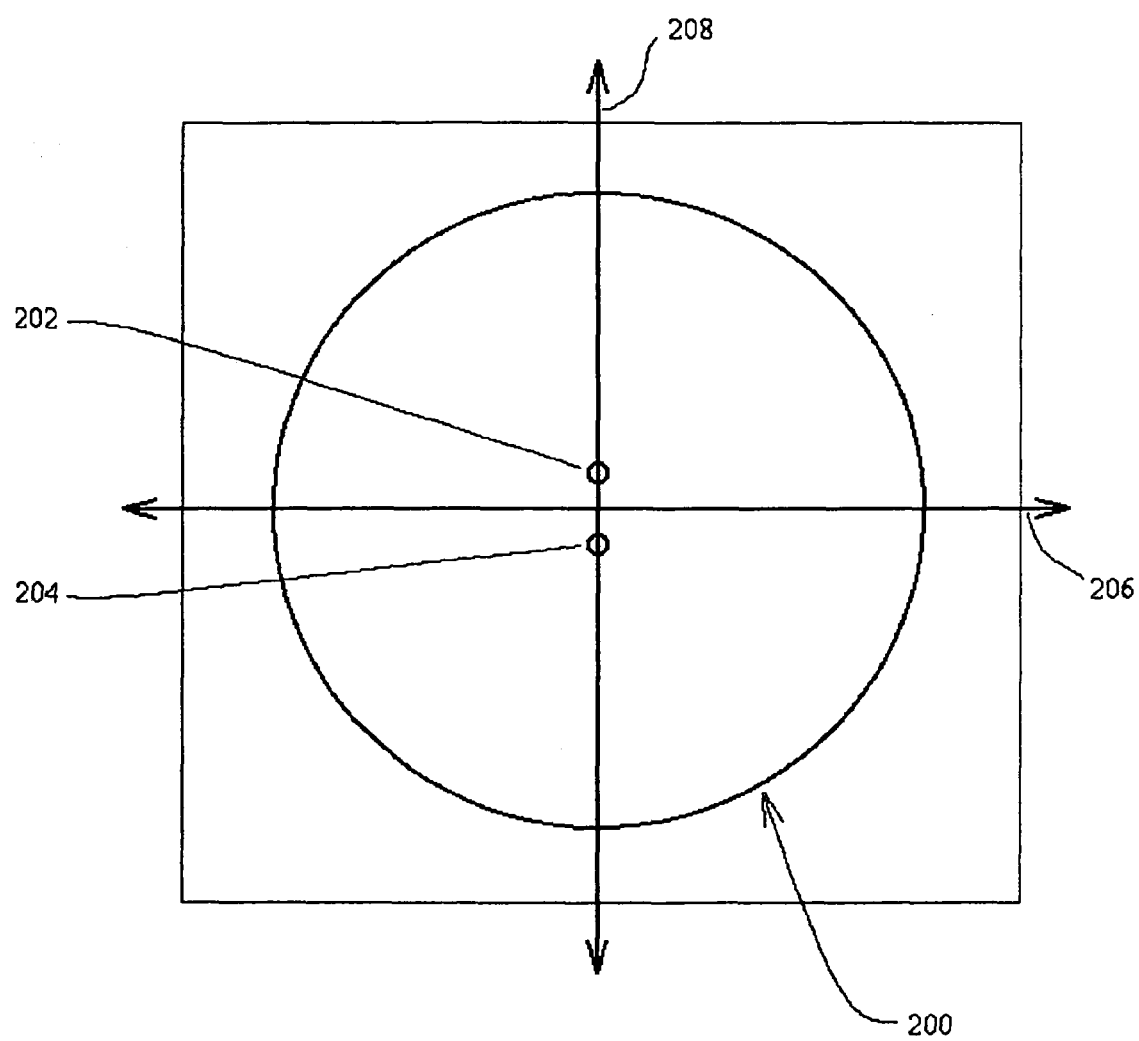
FIG. 6 is a simplified plan view of a workpiece showing beam positioning on the workpiece according to the prior art.

Looking now to FIG. 5, a process is illustrated for X & Y orthogonal cut direction processing using apparatus 10 of FIG. 1. The process includes directing the first beam and the second beam to impact the workpiece at a first and a second impact point, the first and second impact points being positioned diagonally with respect to the X and Y axes of the workpiece at step 100. Moving the first beam 26 and the second beam 28 relative to the planar workpiece 200 and/or the planar workpiece 200 relative to the first beam 26 and the second beam 28 occurs at step 100. At step 104 the cut 12 of the first beam 26 is controlled. At step 106 the cut 14 of the second beam 28 is controlled.

According to this example, step 104 includes aligning the first end 46 of cut 12 of the first beam 26 relative to the first end 48 of cut 14 and/or aligning the second end 50 of cut 12 of the first beam 26 relative to the second end 52 of the cut 14 of the second beam 28. Further according to this example, step 106 includes aligning the first end 48 of cut 14 relative to the first end 46 of cut 12 and/or aligning the second end 50 of cut 14 relative to the second end 48 of cut 12.

If the answer in step 108 is that additional cuts 12, 14 are desired or required, the process repeats back to step 100. If additional cuts 12, 14 are not desired or required, the process ends at step 110.

While the invention has been described in connection with what are presently considered to be the most practical and preferred embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An X & Y orthogonal cut apparatus for scribing a pair of parallel cuts on a planar workpiece, the workpiece plane having an X-axis and a Y-axis perpendicular to the X-axis, the apparatus comprising:
    a laser device, the laser device generating at least two beams including a first beam and a second beam along a Z-axis orthogonal to each of the X-axis and the Y-axis, the first beam and the second beam concurrently impacting the workpiece at a first and a second impact point, the first and second impact points being positioned with respect to the X and Y axes of the workpiece plane such that a line formed by the first and second impact points has a slope of either one or negative one;
    at least one actuator that moves the first and second beams or the workpiece bi-directionally along the X-axis and moves the first and second beams or the workpiece bi-directionally along the Y-axis in order to move the first and the second impact points to scribe a first pair of parallel cuts along the X-axis and a second pair of parallel cuts along the Y-axis; and
    a controller that maintains a relative position of the first and second beams while the first and second beams are concurrently impacting the workpiece at the first and the second impact point such that the first and second impact points of the beams maintain the slope of the line at a same value during the first pair of parallel cuts along the X-axis of the workpiece plane and during the second pair of parallel cuts along the Y-axis of the workpiece plane, the second pair of parallel cuts being perpendicular to the first pair of parallel cuts.

2. The apparatus of claim 1, wherein the laser device comprises:
    a first shutter to control the first beam; and
    a second shutter to control the second beam.

3. The apparatus of claim 2 wherein the controller aligns at least one of a first end of a cut made by the first beam with a first end of a cut made by the second beam and a second end of the cut made by the first beam with a second end of the cut made by the second beam.

4. The apparatus of claim 1, wherein the at least one actuator comprises a first actuator that moves the workpiece bi-directionally along the Y-axis.

5. The apparatus of claim 4, further comprising:
    positioning optics mounted along the Z-axis to direct the laser beams at the workpiece; and wherein the at least one actuator comprises a second actuator that moves the positioning optics bi-directionally along the X-axis.

6. The apparatus of claim 5 wherein the laser device comprises at least one diode-pumped laser.

7. An X & Y orthogonal cut apparatus for a laser device generating at least two beams including a first beam and a second beam for scribing a pair of parallel cuts on a planar workpiece, the workpiece plane having an X-axis and a Y-axis perpendicular to the X-axis, the apparatus comprising:
- positioning optics for directing the first beam and the second beam along a Z-axis orthogonal to each of the X-axis and the Y-axis to concurrently impact the workpiece at a first and a second impact point, the first and second impact points being positioned with respect to the X and Y axes of the workpiece such that a line formed by the first and second impact points has a slope of either one or negative one;
- a first actuator that moves the positioning optics bi-directionally along one of the X-axis and the Y-axis to concurrently move the first and the second beams so that their first and second impact points scribe a pair of parallel cuts along the one of the X-axis and the Y-axis;
- a second actuator that moves the workpiece bi-directionally along the other of the X-axis and the Y-axis to concurrently move the first and the second beams so that their first and second impact points scribe a pair of parallel cuts along the other of the X-axis and the Y-axis, such that the pair of parallel cuts along the other of the X-axis and the Y-axis are perpendicular to the pair of parallel cuts along the one of the X-axis and the Y-axis; and
- a controller that maintains a relative position of the first and second beams such that the first and second impact points of the beams maintain the slope of the line formed by the first and second impact points at a same value during the pair of parallel cuts along the X-axis and during the pair of parallel cuts along the Y-axis.

8. The apparatus of claim 7 further comprising:
- a first shutter to control the first beam; and
- a second shutter to control the second beam.

9. The apparatus of claim 8 wherein the controller operates the first and second shutters to align at least one of a first end of a cut made by the first beam with a first end of a cut made by the second beam and a second end of the cut made by the first beam with a second end of the cut made by the second beam.

10. The apparatus of claim 7 wherein the positioning optics comprises at least one of a mirror and a lens to position the impact points.

11. The apparatus of claim 7, wherein the laser device is located remote from the first actuator.

12. The apparatus of claim 7, wherein the laser device is mounted to the first actuator.

13. A method for scribing a planar workpiece oriented along an X-axis and a Y-axis perpendicular to the X-axis using a laser device generating at least a first beam and a second beam, the method comprising:
- directing the first beam and the second beam along a Z-axis orthogonal to each of the X-axis and the Y-axis to concurrently impact the workpiece at a first impact point and a second impact point, the first and second impact points positioned with respect to the X and Y axes of the workpiece such that a line formed by the first and second impact points has a slope of either one or negative one;
- performing, using at least one actuator, at least one of concurrently moving the first and second beams and their first and second impact points relative to the workpiece and moving the workpiece relative to the first and second beams and their first and second impact points to control a first cut of the first beam along a direction of one of the X-axis and the Y-axis and to control a first cut of the second beam along the direction of the one of the X-axis and the Y-axis such that a first pair of parallel lines is scribed;
- maintaining an orientation of the workpiece with respect to its X and Y axes after the first pair of parallel lines is scribed; and
- performing, using at least one actuator, at least one of concurrently moving the first and second beams and their first and second impact points relative to the workpiece and moving the workpiece relative to the first and the second impact points to control a second cut of the first beam along a direction of the other of the X-axis and the Y-axis and to control a second cut of the second beam along the direction of the other of the X-axis and the Y-axis while maintaining the orientation of the workpiece with respect to its X and Y axes such that a second pair of parallel lines is scribed, the second pair of parallel lines being perpendicular to the first pair of parallel lines.

14. The apparatus of claim 1 wherein the laser device is arranged along the Z-axis and the at least one actuator comprises:
- a first actuator that moves the laser device bi-directionally along the X-axis; and
- a second actuator that moves the workpiece bi-directionally along the Y-axis; wherein one of the first actuator concurrently moves the first and second beams or the second actuation moves the workpiece to scribe the first pair of parallel cuts and the other of the first actuator concurrently moves the first and second beams or the second actuator moves the workpiece to scribe the second pair of parallel cuts perpendicular to the first pair of parallel cuts.

15. The apparatus of claim 14 wherein each of the first pair of parallel cuts and the second pair of parallel cuts forms respective saw cutting zones in a surface of the workpiece.

16. The apparatus of claim 7 wherein each of the first and the second pair of parallel cuts defines a saw cutting zone in a surface of the workpiece.

17. The method of claim 13 wherein the first pair of parallel lines defines a saw cutting zone in a surface of the workpiece, the method further comprising:
- sawing through the workpiece in the saw cutting zone along the one of the X-axis and the Y-axis.

18. The method of claim 13, further comprising:
- ending the first cut of the first beam at a first beam end point;
- ending the first cut of the second beam at a second beam end point wherein the first pair of parallel lines defines a first saw cutting zone in a surface of the workpiece and wherein the first beam end point and the second beam end point are positioned diagonally with respect to the X- and Y-axes;
- starting the second cut of the first beam at the first beam end point;
- starting the second cut of the second beam at the second beam end point, the second pair of parallel lines forming a second saw cutting zone in the surface of the workpiece;
- sawing through the workpiece in the first saw cutting zone along the one of the X-axis and the Y-axis; and
- sawing through the workpiece in the second saw cutting zone along the other of the X-axis and the Y-axis.

* * * * *